United States Patent Office 2,855,438
Patented Oct. 7, 1958

2,855,438

1,4-BIS-(2,2-DIMETHYL-3-ACETYLCYCLOBUTYL) BUTANE AND PROCESS OF PREPARING

Richard K. Madison and Gloria K. Bellis, Stamford, Conn., assignors to American Cyanamid Company, New York, N. Y., a corporation of Maine No Drawing. Application December 21, 1956
Serial No. 629,793

2 Claims. (Cl. 260—586)

This invention relates to 1,4-bis-(2,2-dimethyl-3-acetyl-cyclobutyl) butane having the structural formula

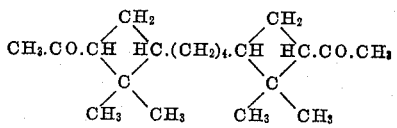

to a method for its preparation, and to the corresponding dicarboxylic acid obtained by its oxidation.

1,4-bis-(2,2-dimethyl-3-acetylcyclobutyl) butane is a clear water-insoluble liquid which is soluble in benzene and other hydrocarbon solvents and boils at 173° C. under 0.65 mm. of mercury pressure. Upon liquid phase oxidation with 50% nitric acid or with oxygen in the presence of cobalt or manganese octoate or other oil soluble catalysts it is converted into the corresponding dicarboxylic acid of the formula

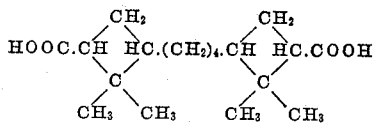

Surface coating resins having a high degree of flexibility are obtained by esterifying this acid with glycerol or other polyhydric alcohols as will be hereinafter more fully described. The acid can also be converted by reduction of its methyl ester with sodium into the corresponding diol of the formula

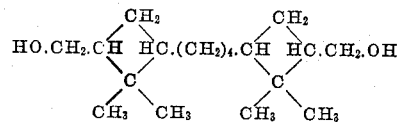

which is useful in the preparation of polyester resins as by reaction with an equimolecular quantity of maleic anhydride and copolymerization with diallyl maleate or diallyl phthalate as described in U. S. Patent No. 2,652,382.

In accordance with the process of the invention, 1,4-bis-(2,2-dimethyl-3-acetylcyclobutyl) butane is prepared by the reductive condensation of two mols of pinane hydroperoxide in the presence of stoichiometric amounts of a ferrous salt. Although inorganic salts such as ferrous sulfate or chloride may be used in an aqueous system the preferred reagents are the organic solvent-soluble ferrous salts such as the soaps of fatty acids of six or more carbon atoms, ferrous naphthenate and the like. In the presence of these reagents pinane hydroperoxide undergoes ring opening and dimerization and forms the bis-compound. The iron compounds are precipitated by addition of an aqueous alkali such as a 10% sodium hydroxide solution and the product is separated by extraction with benzene or other water-insoluble organic solvent. It may be reduced to the corresponding hydrocarbon, which is 1,4-bis-(2,2-dimethyl-3-ethylcyclobutyl) butane.

The invention will be further described and illustrated by the following specific examples.

EXAMPLE 1

1,4-bis-(2,2-dimethyl-3-acetylcyclobutyl) butane was prepared by reduction of pinane hydroperoxide with ferrous octoate by the following procedure.

A reaction flask was charged with 68.5 grams of n-octanoic acid, 400 ml. of water and 16.1 grams of sodium hydroxide. After solution of the soap was complete 400 ml. of benzene and 55.9 grams of ferrous sulfate heptahydrate were added and the mixture was agitated until all the ferrous octoate was in the benzene layer. The aqueous layer was then removed and 30.3 grams of 85.4% pinane hydroperoxide, prepared from alpha-pinene by hydrogenation and subsequent oxidation as described in U. S. Patent No. 2,735,870 and dissolved in 30 ml. of benzene, was added dropwise over a period of thirty minutes, during which time the temperature rose from 32° C. to 46° C. These operations were carried out in an inert atmosphere obtained by passing nitrogen gas through the solution.

After stirring for an additional hour 48 grams of sodium hydroxide was added as a 10% aqueous solution. A benzene layer separated and was decanted; this was dried over sodium sulfate, the benzene was removed and the residue was fractionated. The main fraction, weighing 8.24 grams, was 1,4-bis-(2,2-dimethyl-3-acetylcyclobutyl) butane boiling at 173° C. under 0.65 mm. pressure, $n_D^{25}$ 1.4808. Its analysis was carbon 77.66%; hydrogen 11.12%; calculated for $C_{20}H_{34}O_2$: C, 78.37; H, 11.18.

EXAMPLE 2

Production of 1,4-bis-(2,2-dimethyl-3-carboxycyclobutyl) butane

Ten grams of 1,4-bis-(2,2-dimethyl-3-acetylcyclobutyl) butane, prepared as described in Example 1, was added slowly to an excess of 50% nitric acid maintained at 50°–60° C. The water and excess nitric acid was removed by distillation whereupon the residue, a viscous liquid, slowly crystallized on cooling. The solid dicarboxylic acid crystals, after separation by crystallization and washing with benzene, weighed 6.5 grams and had a neutral equivalent of 153 (theory 155).

Upon esterification of this acid with two mols equivalent of a monohydric aliphatic alcohol such as n-butanol or 2-ethylhexanol, bis-esters are obtained which are plasticizers and which can also be used in alkyd resin manufacture by ester interchange. The acid can also be converted directly into surface coating resins having a high degree of flexibility by reaction with polyhydric alcohols such as ethylene glycol, glycerol, pentaerythritol and the like, with or without modification by the incorporation of non-drying, semi-drying or drying oil fatty acids such as those obtained from coconut oil, cottonseed oil, linseed oil and the like. Thus, for example, a mixture of 2.75 grams of the acid, 2 grams of refined soya fatty acids and 1.1 grams of glycerin may be heated at 230°–235° C. with agitation in an inert atmosphere until a product having an acid number of 10 is obtained. This resin is soluble in xylene and other lacquer thinners and may be used in admixture with a butylated melamine-formaldehyde resin at a 75:25 solids ratio for the production of a pigmented baking lacquer having good flexibility on sheet metal when baked for 20 minutes at 250°–275° C.

EXAMPLE 3

Reduction of 1,4-bis-(2,2-dimethyl-3-acetylcyclobutyl) butane

A reaction flask fitted with a condenser, stirrer and thermometer was charged with 11.46 grams of 1,4-bis-(2,2-dimethyl-3-acetylcyclobutyl) butane, 50 grams of hydrazine hydrate and a solution of 22 grams of sodium in 200 ml. of a mixture of equal volumes of ethylene glycol and diethylene glycol. The mixture was heated to 200° C. and maintained at this temperature for 10 hours. It was then cooled, diluted with water and extracted with ether and dried over sodium sulfate and the ether was removed by distillation. The residue, upon distillation at reduced pressure, gave 4.93 grams of a liquid boiling at 120° C. under 0.45 mm. pressure, $n_D^{26}$ 1.4585. This fraction was refluxed over sodium and redistilled to produce the final hydrocarbon product, a liquid boiling at 120° C. under 0.45 mm. pressure, $n_D^{24}$ 1.4595.

What we claim is:
1. 1,4-bis-(2,2-dimethyl-3-acetylcyclobutyl) butane.
2. A method of producing 1,4-bis-(2,2-dimethyl-3-acetylcyclobutyl) butane which comprises reacting pinane hydroperoxide with a stoichiometric equivalent of a ferrous salt and recovering the 1,4-bis-(2,2-dimethyl-3-acetylcyclobutyl) butane so obtained.

References Cited in the file of this patent
UNITED STATES PATENTS

| | | |
|---|---|---|
| 2,275,752 | Goldberg | Mar. 10, 1942 |
| 2,750,411 | Fisher et al. | June 12, 1956 |